Figure 1:
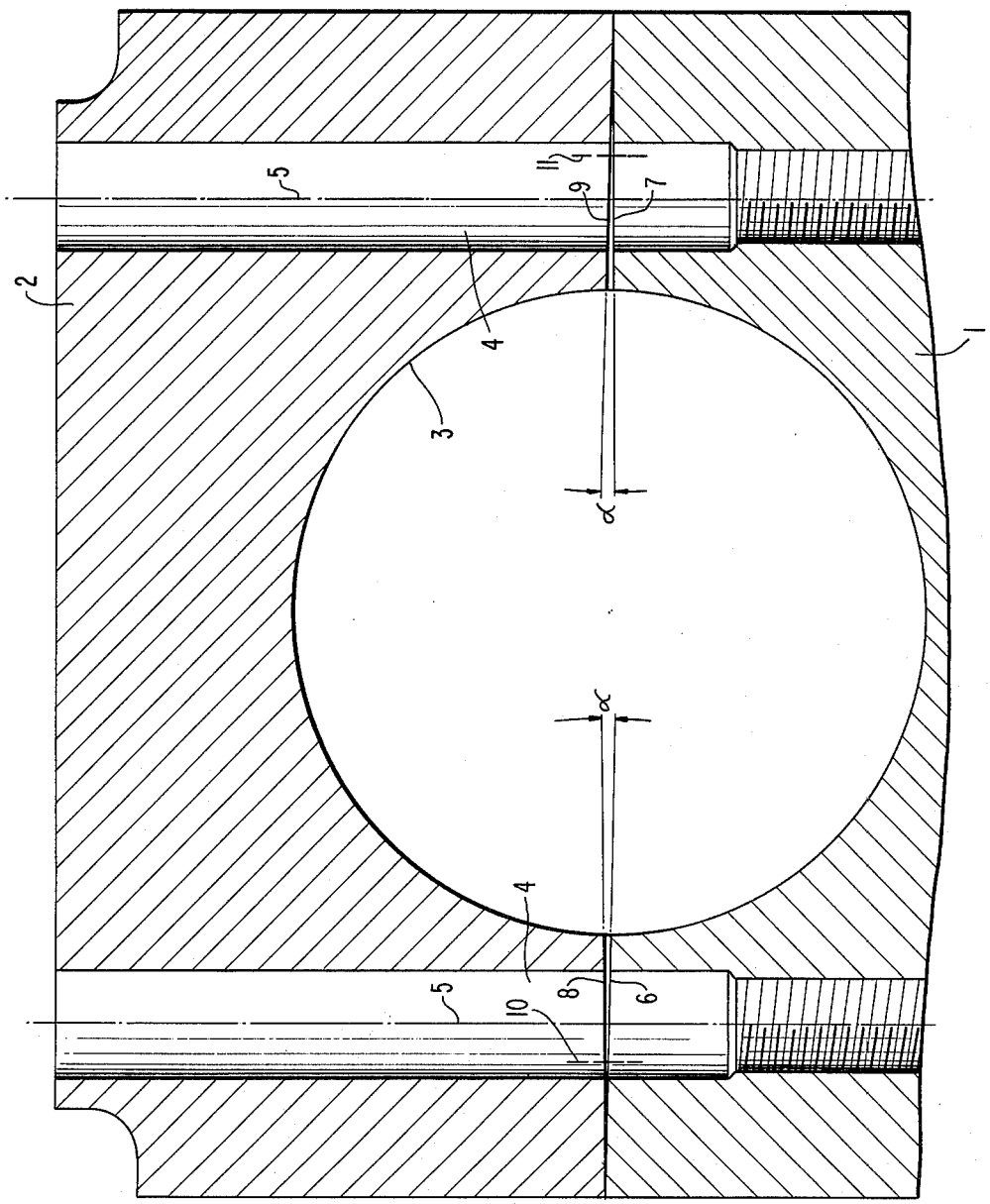

United States Patent [19]

Mirjanic

[11] 4,037,888
[45] July 26, 1977

[54] CONSTRUCTION OF SEPARATING SURFACES OF A SPLIT BEARING

[75] Inventor: Milorad Mirjanic, Fellbach, Germany

[73] Assignee: Daimler-Benz Aktiengesellschaft, Germany

[21] Appl. No.: 539,427

[22] Filed: Jan. 8, 1975

[51] Int. Cl.² .............................................. F16C 19/04
[52] U.S. Cl. ................... 308/74; 74/579 R; 85/1 P; 308/1 R; 308/237 R
[58] Field of Search ............... 308/196, 74; 74/579 R, 74/579 E, 594; 85/1 P, 46

[56] References Cited

U.S. PATENT DOCUMENTS

| | | | |
|---|---|---|---|
| 1,630,759 | 5/1927 | Pierce, Jr. | 38/196 |
| 1,923,211 | 8/1933 | Jarvis | 308/196 |
| 2,876,050 | 3/1959 | Dulin | 308/74 |
| 2,990,218 | 6/1961 | Schlechtendahl | 308/23 |
| 3,362,761 | 1/1968 | Zachariassen | 308/196 |

Primary Examiner—Joseph F. Peters, Jr.
Assistant Examiner—Richard A. Bertsch
Attorney, Agent, or Firm—Craig & Antonelli

[57] ABSTRACT

A construction of the separating surfaces of a split bearing with bores for receiving the cover bolts, in which two adjacent separating surfaces of different bearing parts are inclined to one another when the bearing bolts are not yet tightened, in such a manner that these surfaces subtend an angle of relatively slight magnitude, as viewed in cross section.

17 Claims, 2 Drawing Figures

CONSTRUCTION OF SEPARATING SURFACES OF A SPLIT BEARING

The present invention relates to the construction of the separating surfaces of a split bearing with bores for receiving cover bolts.

The separating surfaces of such bearings are customarily loaded and stressed non-uniformly by the tightened cover bolts because, in order to arrange the cover bolts as close as possible to the bearing bore, the center longitudinal axes of the bores for the cover bolts do not intersect the centers of the separating surfaces. An excessively high load or stress of the separating surfaces in proximity to the bearing bore may bring about an out-of-roundness of the bearing bore. In case the bores for the cover bolts are arranged relatively far from the bearing bore, the load and stress of the separating surfaces in proximity of the bearing bore may be so slight that the separating surfaces lift off thereat from one another when subjected to a load by a bearing pin.

The present invention is concerned with the task to eliminate the aforementioned disadvantages.

The underlying problems are solved according to the present invention in that the two adjacent separating surfaces of different bearing parts are inclined with respect to one another with non-tightened cover bolts in such a manner that they subtend, as viewed in cross section, with respect to one another an angle of slight magnitude.

A comparative moderation and evening-out of the surface pressure takes place by this construction of the separating surfaces according to the present invention because in those portions of the separating surfaces which in the prior art bearings are loaded and stressed the most, a load occurs in the bearing according to the present invention only with partially tightened cover bolts. It is thereby appropriate that, in case the longitudinal center axes of the bores of the cover bolts intersect the separating surfaces laterally of the center thereof, as viewed in cross section, the angle opens toward that side of the center of the separating surfaces on which the center longitudinal axes are located. Hence, the angle opens inwardly toward the bearing bore if the aforementioned center longitudinal axes of the cover bolt bores intersect the separating surfaces between the center thereof and the bearing bore and opens toward the outside if these center longitudinal axes of the cover bolt bores intersect the separating surfaces in their outer halves.

According to a further advantageous feature of the present invention, the size of the angle is so selected that with cover bolts tightened to about one-fourth, the separating surfaces abut at one another everywhere. A good comparative moderation of the surface pressure results therefrom without the existence of the danger that the separating surfaces lift off from one another in the presence of loads by the bearing pin. It follows therefrom that the further the center longitudinal axes of the bores of the cover bolts are from the center of the separating surfaces the larger the selected angle. The angle reaches a magnitude of about 30 minutes with this angle also depends from the selected material.

The construction of the separating surfaces according to the present invention can also be used when the separating surfaces are toothed in a conventional manner. Added to the advantages of the present invention are then the known advantages which result from the possibility to absorb radial forces in the separating surfaces.

Accordingly, it is an object of the present invention to provide a split bearing which avoids by simple means the aforementioned short-comings and drawbacks encountered in the prior art.

Another object of the present invention resides in a split bearing whose separating surfaces are so constructed that excessive loads and stresses of the separating surfaces in proximity to this bearing bore are effectively avoided.

A further object of the present invention resides in a split bearing construction in which the danger of distortion of the roundness of the bearing bore into an out-of-round configuration is minimized yet the likelihood of a lifting off of the separating surfaces from one another as a result of loads by a bearing pin is minimized.

Figure 2:
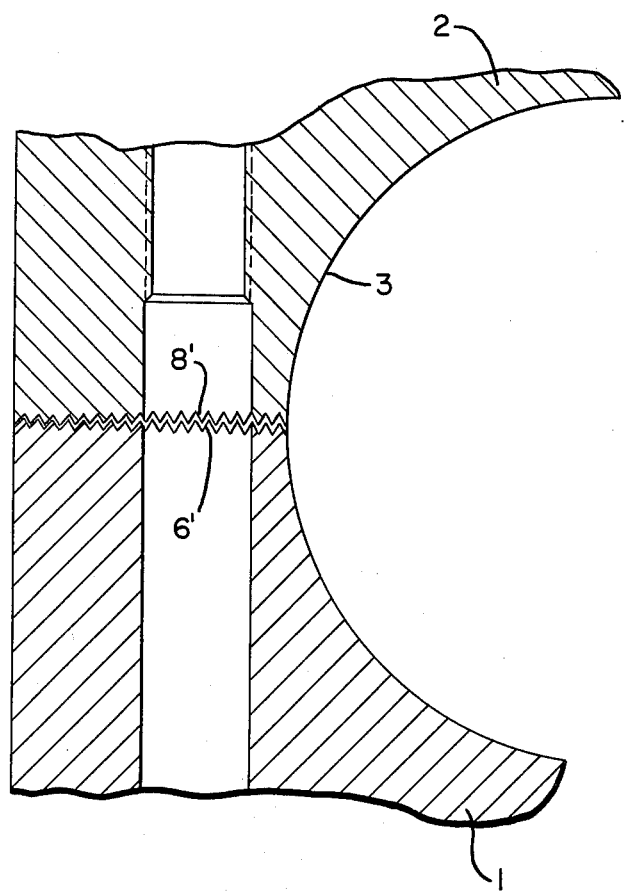

These and other objects, features and advantages of the present invention will become more apparent from the following description when taken in connection with the accompanying drawing which shows, for purposes of illustration only, two embodiments in accordance with the present invention and wherein:

FIG. 1 is a partial cross-sectional view through a split bearing in accordance with a first embodiment of the present invention; and FIG. 2 is a partial cross-sectional view through a split bearing in accordance with a second embodiment of the present invention.

Referring now to the drawings, wherein like reference numerals designate like parts and more particularly to FIG. 1, according to this figure, the split bearing consists of a bearing lower part 1 and of a bearing cover 2. Reference numeral 3 designates the bearing bore, in which can be supported a bearing pin (not shown) within a bearing box or brass of conventional type (also not shown). The lower bearing portion 1 and the bearing cover 2 are connected with each other by cover bolts (not shown) which are inserted into the bore 4. The center longitudinal axes of the bores 4 are designated by reference numeral 5. These center longitudinal axes 5 intersect the separating surfaces 6 and 7 coordinated to the lower bearing part 1 as well as the separating surfaces 8 and 9 coordinated to the bearing cover 2 laterally of the centers 10 and 11 thereof, and more particularly on the side toward the bearing bore 3. If now the separating surfaces 6, 7, 8 and 9 were constructed parallel to one another, then a non-uniform distribution of the surface pressure in the separating surfaces 6, 7, 8 and 9 would result. The maximum surface pressure would result in proximity of the bearing bore 3 so that the latter might become out of round.

These indicated disadvantages are avoided in that the separating surfaces 6 and 8 as well as the separating surfaces 7 and 9 subtend with respect to one another an angle $\alpha$, respectively, which opens in the direction toward the inside, i.e., toward the bearing bore 3. The size of the angle $\alpha$ amounts to about 30 minutes. It may be formed in that material is removed either only from the bearing bottom portion 1 or only from the bearing cover 2 or from both.

In the illustrated position of FIG. 1 with the bearing cover 2 only loosely placed upon the lower bearing part 1, the separating surfaces 6 and 8 as well as 7 and 9 contact one another only with their outer edges. If now the cover bolts are now tightened to about one-fourth of their full tightening, then the separating surfaces 6 and 8 as well as 7 and 9 contact one another over their entire area. The separating surfaces 6, 7, 8 and 9 are thereby exposed at their outer sides already to a surface pressure which during the further tightening of the cover bolts increases less than the surface pressure on the inner sides of the separating surfaces 6, 7, 8 and 9 so that with fully tightened cover bolts, a far-reachingly uniform distribution of the surface pressure results. The strongly increased surface pressure in proximity to the bearing bore 3 is avoided in accordance with the present invention.

As shown in FIG. 2, the separating surfaces 6', 8' of the lower bearing portion 1 and bearing cover 2 are toothed in a conventional manner resulting in a construction by which radial forces at the separating surfaces 6', 8' are absorbed.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A construction of the separating surfaces of a split bearing provided with bores for receiving tightening bolts and with center longitudinal axes of the bores of the bolts intersecting the separating surfaces laterally of the center of the separating surfaces, as viewed in cross section, characterized in that two adjacent separating surfaces of different bearing parts are inclined to one another with non-tightened bolts in such a manner that they subtend, as viewed in cross-section, an angle of the magnitude of less than 1°, and in that said angle opens in the direction toward that side of the center of the separating surfaces, on which are located the center longitudinal axes of the bores of the bolts.

2. A construction of the separating surfaces according to claim 1, characterized in that the magnitude of the angle is so selected that with the bolts tightened to about one-fourth of full tightening, the separating surfaces abut at one another essentially over their entire surfaces.

3. A construction of the separating surfaces according to claim 2, characterized in that the separating surfaces are provided with tooth means.

4. A construction of the separating surfaces according to claim 3, characterized in that the bearing parts include a lower bearing part and a bearing cover and in that the bolts are cover bolts.

5. A construction of the separating surfaces of a split bearing provided with bores for receiving tightening bolts, characterized in that two adjacent separating surfaces of different bearing parts are inclined to one another with non-tightened bolts in such a manner that they subtend, as viewed in cross section, an angle of the magnitude of less than 1°, the magnitude of the angle is so selected that with the bolts tightened to about one-fourth of full tightening, the separating surfaces abut at one another essentially over their entire surfaces.

6. A construction of the separating surfaces of a split bearing provided with bores for receiving tightening bolts, characterized in that two adjacent separating surfaces of different bearing parts are inclined to one another with non-tightened bolts in such a manner that they subtend, as viewed in cross section, an angle of the magnitude of less than 1°, and in that the bearing parts include a lower bearing part and a bearing cover and in that the bolts are cover bolts.

7. A construction of the separating surfaces according to claim 6, with center longitudinal axes of the bores of the bolts intersecting the separating surfaces laterally of the center of the separating surfaces, as viewed in cross section, characterized in that said angle opens in the direction toward that side of the center of the separating surfaces, on which are located the center longitudinal axes of the bores of the bolts.

8. A construction of the separating surfaces of a split bearing provided with bores for receiving tightening bolts, characterized in that two adjacent separating surfaces of different bearing parts are inclined to one another with non-tightened bolts in such a manner that they subtend, as viewed in cross section, an angle of the magnitude of less than 1°, and in that the separating surfaces are provided with tooth means.

9. A construction of the separating surfaces according to claim 8, characterized in that the magnitude of the angle is so selected that with the bolts tightened to about one-fourth of full tightening, the separating surfaces abut at one another essentially over their entire surfaces.

10. A construction of the separating surfaces of a split bearing provided with bores for receiving tightening bolts, characterized in that two adjacent separating surfaces of different bearing parts are inclined to one another with non-tightened bolts in such a manner that they subtend, as viewed in cross section, an angle of the magnitude of less than 1°, and in that the split bearing defines a bearing bore for receiving a bearing means, the center longitudinal axes of the bores for receiving the tightening bolts intersecting the separating surfaces at a position laterally displaced from the center of the separating surfaces such that the longitudinal axes of the bores for receiving the tightening bolts are disposed nearer the bearing bore than the center of the separating surfaces, and in that said angle opens in the direction of the bearing bore.

11. A construction of the separating surfaces according to claim 10, characterized in that the magnitude of the angle is so selected that with the bolts tightened to about one-fourth of full tightening, the separating surfaces abut at one another essentially over their entire surfaces.

12. A construction of the separating surfaces according to claim 11, characterized in that the separating surfaces are provided with tooth means.

13. A construction of the separating surfaces according to claim 10, characterized in that the separating surfaces are provided with tooth means.

14. A construction of the separating surfaces of a split bearing provided with bores for receiving tightening bolts, characterized in that two adjacent separating surfaces of different bearing parts are inclined to one another with non-tightened bolts in such a manner that they subtend, as viewed in cross section, an angle of the magnitude of less than 1°, and in that the split bearing includes a bearing bore for receiving a bearing means, the center longitudinal axes of the bores for receiving the tightening bolts intersecting the separating surfaces at a position laterally displaced from the center of the separating surfaces such that the center of the separating surfaces are disposed nearer the bearing bore than the longitudinal axes of the bores for receiving the tightening bolts, and in that said angle opens in a direction away from the bearing bore.

15. A construction of the separating surfaces according to claim 14, characterized in that the magnitude of the angle is so selected that with the bolts tightened to about one-fourth of full tightening, the separating surfaces abut at one another essentially over their entire surfaces.

16. A construction of the separating surfaces according to claim 15, characterized in that the separating surfaces are provided with tooth means.

17. A construction of the separating surfaces according to claim 14, characterized in that the separating surfaces are provided with tooth means.

* * * * *

UNITED STATES PATENT OFFICE
CERTIFICATE OF CORRECTION

Patent No. 4,037,888   Dated  July 26, 1977

Inventor(s)   Milorad MIRJANIC

It is certified that error appears in the above-identified patent and that said Letters Patent are hereby corrected as shown below:

Below Line:

[22]   Filed:    Jan. 8, 1975

Insert:

[30]   Foreign Application Priority Data

Jan 9, 1974   Germany............P 24 00 899.9

Signed and Sealed this

Sixth Day of December 1977

[SEAL]

*Attest:*

RUTH C. MASON  
*Attesting Officer*

LUTRELLE F. PARKER  
*Acting Commissioner of Patents and Trademarks*